United States Patent [19]

Yamada et al.

[11] 4,307,314

[45] Dec. 22, 1981

[54] BARREL-SHAPED CLAW-POLE ROTOR FOR INDUCTION TYPE AC GENERATOR

[75] Inventors: Shigeki Yamada; Akira Tokairin, both of Katsuta, Japan

[73] Assignee: Hitachi, Ltd., Tokyo, Japan

[21] Appl. No.: 80,028

[22] Filed: Sep. 28, 1979

[30] Foreign Application Priority Data

Sep. 29, 1978 [JP] Japan ............................. 53-119332

[51] Int. Cl.$^3$ ............................................. H02K 1/12
[52] U.S. Cl. .................................... 310/263; 310/194
[58] Field of Search ............... 310/261, 263, 192–194, 310/42, 43, 45

[56] References Cited

U.S. PATENT DOCUMENTS

| | | | |
|---|---|---|---|
| 2,588,175 | 3/1952 | Stewart et al. | 310/263 UX |
| 3,305,740 | 2/1967 | Shano | 310/263 X |
| 3,603,825 | 9/1971 | Sheridan et al. | 310/194 |

FOREIGN PATENT DOCUMENTS 2014559 10/1970 Fed. Rep. of Germany ...... 310/263
2817999 11/1979 Fed. Rep. of Germany ...... 310/263

Primary Examiner—Mark O. Budd
Attorney, Agent, or Firm—Craig and Antonelli

[57] ABSTRACT

A rotor for use in an induction type a.c. generator and a method for fabricating the same are disclosed. The rotor comprises pole pieces having pointed ends at their peripheries, the pointed ends of one pole piece and the pointed ends of the other pole piece alternating in position and serving as, alternately, north and south magnetic poles; a core or yoke disposed between the pole pieces to magnetically coupling the pole pieces; an insulating bobbin disposed on the core or yoke and between the pole pieces; and an exciting coil wound on the bobbin cylindrically. The core or yoke is in the shape of a barrel and the insulating bobbin is forcibly mounted on the barrel-shaped core by the application of pressure.

6 Claims, 11 Drawing Figures

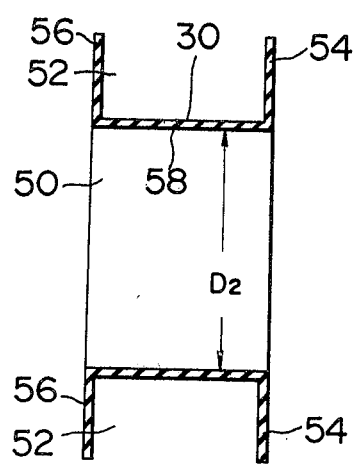
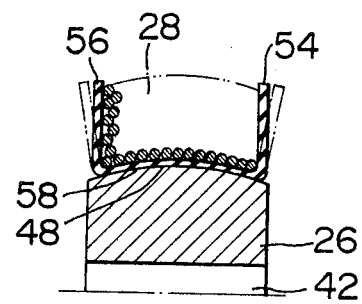
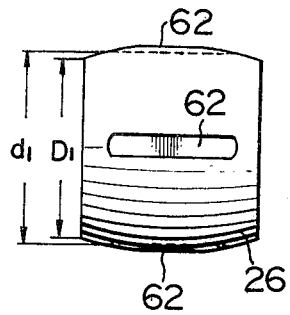 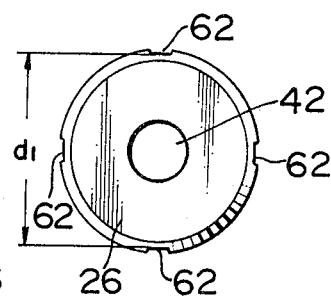 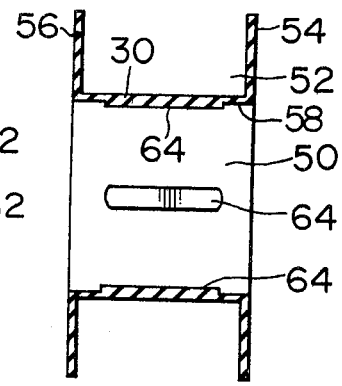
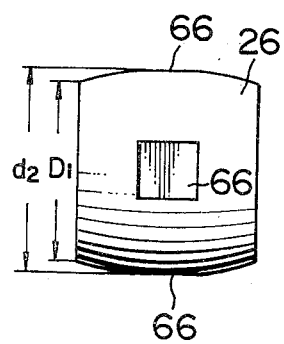 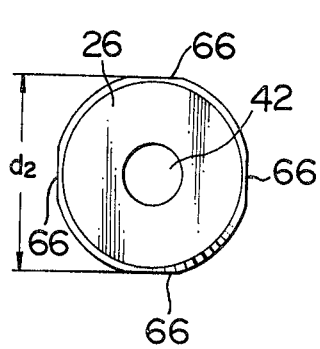 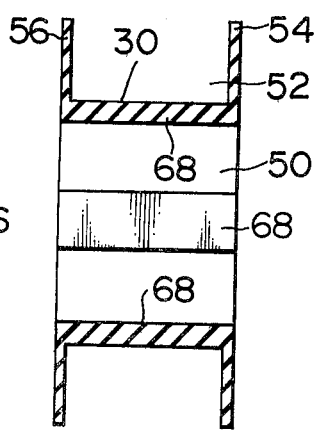

BARREL-SHAPED CLAW-POLE ROTOR FOR INDUCTION TYPE AC GENERATOR

This invention relates to a rotor for use in an induction type a.c. generator and a method for fabricating the same, especially having an iron core or yoke suitable in configuration to hold an exciting coil of a cylindrical shape fixedly thereon.

In a conventional rotor for a rotating field type induction a.c. generator particularly having pole pieces formed with pointed ends at their peripheries, a cylindrical iron core or yoke portion is provided between the pole pieces, an insulating bobbin of nylon or the like is fixedly fitted onto the core or yoke portion, and an exciting coil is wound on the bobbin.

Such an iron core or yoke is usually formed by one of two methods in general use: according to one method, the core or yoke portion and one of the associated pole pieces are formed integrally through hot forming, and according to the other method, the core or yoke portion is formed, separately from the associated pole pieces, into a cylindrical shape. In any case, the core or yoke portion is made cylindrical to be fitted into a cylindrical bobbin so that the way how to fix the bobbin onto the core or yoke portion, i.e. anti-slipping coupling, is a serious problem.

It is customary that the bobbin is integrally made of, for example, nylon and has a small thickness so as to facilitate the operation for winding a coil on the bobbin and to effectively utilize the winding space. However, since nylon, of which the bobbin is made, is thermoplastic, the bobbin itself undergoes thermal contraction and the difference between the inner diameters of the bobbin in dry and wet conditions is as large as 0.2 mm. To compensate this dimensional fluctuation, it is necessary to devise a special shape for the bobbin. It is however difficult to fix the bobbin directly to the core or yoke. Further, nylon is not wettable to the varnish with which the coil wound on the bobbin is treated for insulation. Accordingly, there may occur a relative displacement between the bobbin and the core or yoke or between the coil and the bobbin during the rotation of the rotor with the result that the exciting coil may be broken by tension induced in the coil due to the relative displacement. This fault will considerably deteriorate the function of the generator.

Therefore, an object of this invention is to provide a rotor for an induction a.c. generator, which is free from the above-mentioned drawbacks of the conventional rotor of the same kind and in which the coil bobbin is securely coupled to the core or yoke and the coil is also securely coupled to the bobbin.

According to one aspect of this invention, which has been made to attain the above object, thee is provided a rotor for use in an induction type a.c. generator, comprising a rotary shaft; a pair of pole pieces attached fixedly to the rotary shaft and each having at least two pointed ends along its periphery so that the pointed ends of the two pole pieces become, alternately, north and south poles in use; a barrel-shaped ion core or yoke rigidly fixed to the rotary shaft, interposed closely between the pair of the pole pieces to magnetically couple the pole pieces, the barrel-shaped core or yoke having a bulged circumferential surface and plane ends parallel with each other; an insulating coil bobbin having a hollow cylindrical portion and flanges extending radially outwardly at the opposite ends of the hollow cylindrical portion, the bobbin being disposed between the pole pieces and press-fitted on the bulged circumferential surface of the core or yoke; and an exciting coil wound cylindrically on the bobbin.

Further, according to another aspect of this invention, there is provided a method for fabricating a rotor for an induction type a.c. generator, comprising the steps of: (A) preparing a pair of pole pieces each having a flat inner surface, a central bore and at least two pointed ends extending inwardly on its periphery and perpendicularly to the flat inner surface; (B) preparing a core or yoke in the shape of a barrel, having a bulged circumferential surface, flat parallel ends and an axial bore; (C) preparing an insulating coil bobbin having a hollow cylindrical portion with an inner diameter larger than the outer diameter at each of the ends of the iron core or yoke while smaller than the outer diameter at the bulged portion of the same, and flanges extending radially outwardly at the opposite ends of the hollow cylindrical portion; (D) preparing a rotary shaft with its middle portion knurled; (E) press-fitting the core or yoke into the hollow cylindrical portion of the bobbin; (F) winding an exciting coil on the bobbin; (G) press-fitting the rotary shaft into the central bore of one of the pole pieces up to a predetermined position on the knurled portion of the rotary shaft; and (H) press-fitting the other pole piece and the core or yoke with the exciting coil mounted thereon, to the rotary shaft in such a manner that the core or yoke is interposed between the pole pieces and that the flat ends of the core or yoke are brought into very close contact with the flat inner surfaces of the pole pieces so as not to leave any substantial air gaps therebetween.

In a preferable embodiment, at least one or more slits or plane areas may be cut in the bulged circumferential surface of the core or yoke and correspondingly the inner surface of the hollow cylindrical portion of the coil bobbin is provided with projections or plane areas complementary in shape and equal in number to the slits or plane areas, so that the mechanical coupling between the core or yoke and the coil bobbin can be enhanced by engaging the slits or the plane areas of the core or yoke with the corresponding projections or plane areas of the coil bobbin in the assembled state.

Other objects, features and advantages of this invention will be apparent from the following description of the preferred embodiments of this invention, made in conjunction with the attached drawings, in which:

FIG. 4 shows in longitudinal section a coil bobbin before assembling;

FIG. 5 shows on an enlarged scale a principal portion of the rotor of FIG. 1;

FIG. 6 shows in front view an iron core or yoke as another embodiment of this invention;

FIG. 7 is a side view of the iron core or yoke of FIG. 6;

FIG. 8 shows in longitudinal section a coil bobbin suitable for the iron core or yoke of FIGS. 6 and 7;

FIG. 9 shows a front view an iron core or yoke as still another embodiment of this invention;

FIG. 10 is a side view of the iron core or yoke of FIG. 9; and

FIG. 11 shows in longitudinal section a coil bobbin suitable for the iron core or yoke of FIGS. 9 and 10.

Figure 1:
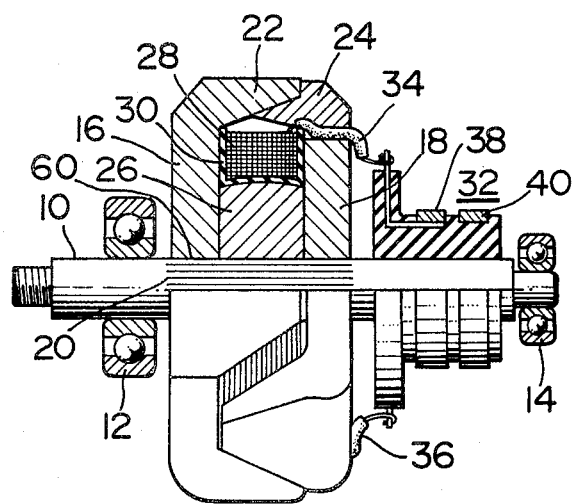
FIG. 1 shows in longitudinal section a rotor as an embodiment of this invention.

Reference is made now to FIG. 1 showing the first embodiment of this invention. A rotary shaft 10 is rotatably supported on a stator (not shown) by means of ball bearings 12 and 14. Magnetic pole pieces 16 and 18, oppositely disposed, are made through cold forging and are pressure-fitted on and rigidly secured to, the axially knurled portion 20 in the middle of the rotary shaft 10. Each of the pole pieces 16 and 18 has a plurality of pointed ends, the pole piece 16 having pointed ends 22 and the pole piece 18 having pointed ends 24. When the rotor is assembled, the pole pieces 16 and 18 are so disposed relative to each other that the pointed ends 22 and 24 are located alternately along the outer periphery of the rotor. The core or yoke 26 is also press-fitted on the rotary shaft 10 as in the case of the pole pieces and between the pole pieces in a manner so that it is brought into close contact with each of the pole pieces so as not to leave air gaps therebetween. A coil bobbin 30, which is interposed between the pole pieces 16 and 18 and on which an exciting winding is wound in the form of a cylinder, is made of a thermoplastic resin material such as nylon. The exciting coil 28, wound on the bobbin 30, is impregnated with varnish or applied with powdered insulating resin so as to establish a sufficient conductor-to-conductor insulation. The winding start 34 and the winding end 36 are led out and connected respectively with the conductor rings 38 and 40 of a slip ring arrangement 32 secured on the rotary shaft 10.

Now, the details of the steps for fabricating the above described rotor will be explained below with the aid of FIGS. 1 to 5.

(1) Preparing iron core or yoke

Figure 2:
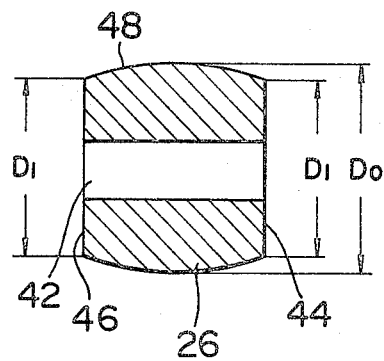
FIG. 2 shows in enlarged longitudinal section the iron core or yoke of the rotor of FIG. 1.
Figure 3:
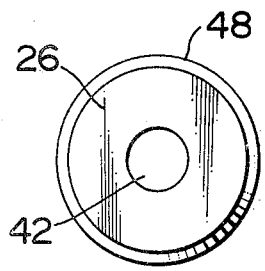
FIG. 3 is a side view of the iron core or yoke of FIG. 2.

The iron core or yoke 26 is formed through cold forging or the like as shown in FIGS. 2 and 3. Namely, it has an axial bore 42 and opposite flat end surfaces 44 and 46 perpendicular to the axis thereof. The circumferential surface of the core or yoke 26 is in the shape of a barrel, with a diameter $D_1$ at each of the end surfaces 44 and 46 and a greater diameter $D_o$ in the middle of the axial length.

(2) Preparing coil bobbin

The bobbin 30 is formed of a thermoplastic resin material such as nylon in the configuration shown in FIG. 4. The configuration has a hollow cylindrical portion 50 provided in the axial direction thereof and having an internal diameter of $D_2$ which is substantially equal over the entire length thereof, and flanges 54 and 56 which extend outwardly perpendicularly to the axis at the opposite ends of the hollow cylindrical portion 50 so as to define a U-shaped space 52 in which the exciting coil 28 is to be wound. It is necessary that the axial length of the core or yoke 26 should equal the axial length of the bobbin 30. The inner diameter $D_2$ of the hollow cylindrical portion 50 of the bobbin 30 is so selected as to be greater than the outer diameter $D_1$ at each end and smaller than the outer diameter $D_o$ in the middle, of the core or yoke 26.

(3) Press-fitting bobbin onto core or yoke

When the core or yoke 26 is inserted into the hollow cylindrical portion 50 of the bobbin 30 with the uniform inner diameter $D_2$ chosen as above, the end portion of the core or yoke 26 is freely introduced into the bobbin 30 without causing the distortion of the bobbin 30 because the inner diameter $D_2$ is selected to be larger than the outer diameter $D_1$. As the insertion goes on, it becomes necessary to pressingly push the portion of the core or yoke 26 having a larger diameter than that of the hollow cylindrical portion 50 of the bobbin 30, into the hollow cylindrical portion 50. Therefore, when the core or yoke 26 is completely inserted in the bobbin 30, the hollow cylindrical portion 50 of the bobbin 30 is distorted into a barrel shape in accordance with the shape of the circumferential surface of the core or yoke 26, as shown in FIG. 5. Accordingly, the flanges 54 and 56 of the bobbin 30 are urged to spread gradually outward so that the distance between them increases as the distance in the direction perpendicular to the axis of the core 26 or yoke increases therefrom, as shown in FIG. 5 with a two-dotted chain line. These distortions not only enhance the mechanical coupling between the core or yoke 26 and the bobbin 30 but also facilitate the operation of winding the exciting coil 28.

(4) Winding exciting coil onto bobbin

The exciting coil 28 is wound around the hollow cylindrical portion 50 in the U-shaped space 52 between the flanges 54 and 56 according to the known method, which is not explained here since it is not directly relevant to this invention. With this coil structure, the tension of the coil conductor presses the inner surface 58 of the hollow cylindrical portion 50 of the bobbin 30 against the outer circumferential surface 48 of the core or yoke 26 to further strengthen the mechanical coupling between the core or yoke 26 and the bobbin 30.

In a preferred embodiment in which the maximum outer diameter $D_o$ of the core or yoke 26 is selected to be 47.3 mm, the minimum outer diameter $D_1$ 46.9 mm, and the uniform inner diameter $D_2$ of the hollow cylindrical portion 50 of the bobbin 47.0 mm, merely for example, the radially forward periphery of each of the flanges 54 and 56 protrudes outwardly by about 0.1 mm from a vertical plane including each of the plane end surfaces 44 and 46 of the core or yoke 26 and the envelope of the outermost layer of the coil 28 is a barrel-like surface having a small curvature, when the coil 28 is completely wound on the bobbin 30.

(5) Preparing pole pieces and rotary shaft and fixing one of the pole pieces to rotary shaft The pole pieces 16 and 18 are shaped by cold forging to have inner plane end surfaces which are to be brought into contact with the plane end surfaces 46 and 44 of the core or yoke 26 and equidistant pointed ends 22 and 24 extending inwardly from the periphery of the pieces 16 and 18 and perpendicularly to the inner plane end surfaces, respectively.

The middle portion of the rotary shaft 10 is knurled in the axial direction, as described above and shown in FIG. 1. The rotary shaft 10 is then inserted into the bore 60 of one of the pole pieces, for example, the pole piece 16 and driven by pressure up to a predetermined position of the axially knurled portion 20 so that the pole piece 16 is fixed on the shaft 10 at this point.

(6) Fixing core or yoke with exciting coil and the other pole piece to rotary shaft.

The rotary shaft 10 with the pole piece 16 fixed to the axially knurled portion thereof, is inserted into the bores of the core or yoke with coil 28 mounted thereon and of the other pole piece 18 and then thrusted up to the axially knurled portion 20 of the shaft 10 by, for example, applying pressure of about 550 ton onto the outer surfaces of the pole pieces 16 and 18. Accordingly, the core or yoke 26 and the pole piece 18 are rigidly fixed in the predetermined positions on the shaft 10 and moreover the inner plane surfaces of the pole pieces 16 and 18 and the end plane surfaces 46 and 44 are respectively brought into very close contact with each other to form a continuous, that is, gap-free, magnetic flux path. In this press-assembling of the pole pieces and the core or yoke, the flanges 54 and 56 of the bobbin 30, which have been slightly coned outward as shown by two dotted chain line in FIG. 5, are pressed into the positions shown by solid line in FIG. 5, perpendicular to the axis of the rotary shaft 10. As a result, the forces urging the respective flanges 54 and 56 against the inner surfaces of the pole pieces 18 and 16 increase the contact pressures between the flanges and the pole pieces to further enhance the mechanical coupling between the core or yoke 26 and the bobbin 30. Moreover, the above mentioned deformation of the flanges due to pressure gives rise to forces acting from one turn of the coil 28 to another and between the coil 28 as a whole and the bobbin 30 so that the relative displacement between the coil and the bobbin can be prevented. The coil 28 is then subjected to insulation treatment using varnsh or powder of insulating resin.

(7) Fixing previously prepared slip ring arrangement to rotary shaft

The slip ring arrangement 32 which has been prepared separately is mounted on and rigidly fixed to the rotary shaft 10, and the ends 34 and 36 of the exciting coil 28 are electrically connected to the conductor rings 38 and 40 of the slip ring arrangement 32.

According to the above embodiment of this invention, the following advantageous effects can be obtained:

(1) Since the core or yoke can assume such a shape as to be adapted to the thermal change in the dimensions of the bobbin, the bobbin can always be fixed to the core or yoke.

(2) Since the bobbin is fixed to the core or yoke under its contracting pressure, the operation of winding the coil on the bobbin can be smoothly performed.

(3) Since the bobbin has its hollow cylindrical portion fixed to the core or yoke under the contracting pressure and its flanges urged against the inner surface of the pole pieces, the bobbin is prevented from being moved relative to the flanges and the core or yoke by the rotational moment acting thereon. Therefore, the exciting coil can be prevented from breaking owing to the tension induced in the coil due to displacement of the bobbin.

(4) Since the bobbin is forcibly mounted on the barrel-shaped core or yoke by the application of pressure, the flanges of the bobbin are slightly coned outward so that the operation of winding the coil is facilitated.

(5) Since the core or yoke has a barrel-like shape, it has a greater workability than the conventional core or yoke having a uniform diameter. This is because in the case where the plane end surfaces of the core or yoke are formed by, for example, cold forging, the inflated circumferential portion of the core or yoke can absorb the displacements of atoms in the core induced by the application of pressure on the plane end surfaces for improving the smoothness thereof.

FIGS. 6 and 7 show respectively a front and a side view of a core or yoke 26 as another embodiment of this invention. In this invention, the core or yoke 26 is also in the shape of a barrel and plural (four in this embodiment) slits 62 are cut in the axial direction in the bulged side surface of the core or yoke 26. The distance $d_1$ between the bottoms of the pair of diametrically opposite slits 62 is chosen to be greater than the outer diameter $D_1$ at the end of the core 26. Moreover, the inner surface 58 of the hollow cylindrical portion 50 of the bobbin 30 is provided with ridges 64 equal in number and complementary in shape, to the slits, as shown in FIG. 8. In the assembled condition, the ridges 64 of the bobbin 30 are respectively engaged with the corresponding slits 62 of the core or yoke 26 so that the mechanical coupling between the bobbin 30 and the core or yoke 26 against the rotary moment exerted on the coil 28 and therefore on the bobbin 30 is enhanced. This embodiment is therefore considered to have a higher reliability in respect to the bobbin-to-core mechanical coupling.

FIGS. 9 and 10 show respectively a front and a side view of a core or yoke as still another embodiment of this invention. In this invention, to facilitate the working, plural (four in this embodiment) plane areas 66 are formed on the outer bulged circumferential surface of the core or yoke 26 by cutting and corresponding plateau-like projections 68 equal in number and complementary in shape, to the plane areas 66 are formed on the inner surface 58 of the cylindrical portion 50 of the bobbin 30. It will be naturally understood that the plateau-like projections 68 of the bobbin 30 are engaged with the plane areas 66 of the core or yoke 26 in the assembled condition. In this case, too, the distance $d_2$ between the diametrically opposite plane areas 66 is adjusted to be larger than the diameter $D_1$ of the core or yoke 26 at each end thereof. It is apparent that this embodiment can obtain the same effect as the directly above-mentioned embodiment obtains.

What we claim is:

1. A rotor for use in an induction type a.c. generator, comprising
   a rotary shaft;
   a pair of pole pieces attached fixedly to said rotary shaft and each having at least two pointed ends along its periphery so that the pointed ends of said pair of pole pieces become, alternately, north and south poles in use;
   a barrel-shaped core or yoke rigidly fixed to said rotary shaft, interposed closely between said pole pieces to magnetically couple said pole pieces, said barrel-shaped core or yoke having a bulged circumferential surface and flat parallel ends;
   an insulating coil bobbin having a hollow cylindrical portion and flanges extending radially outwardly at the opposite ends of said hollow cylindrical portion, said coil bobbin being disposed between said pole pieces and press-fitted on said bulged circumferential surface of said core or yoke; and
   an exiciting coil wound cylindrically on said bobbin.

2. A rotor as claimed in claim 1, wherein at least one slit is cut in said bulged circumferential surface of said barrel-shaped core or yoke and the inner surface of said hollow cylindrical portion of said coil bobbin is provided with at least one projection corresponding to said slit, so that the mechanical coupling between said core or yoke and said coil bobbin can be enhanced by engaging said projection with said slit in the assembled state.

3. A rotor as claimed in claim 1, wherein at least one plane area is formed in said bulged circumferential surface of said core or yoke and the inner surface of said hollow cylindrical portion of said coil bobbin is provided with at least one plane area corresponding to said plane area of said core or yoke, so that the mechanical coupling between the core or yoke and said coil bobbin can be enhanced by engaging said plane area of said rotor core with said plane area of said coil hobbin in the assembled state.

4. A rotor as claimed in claim 1, wherein the diameter of said core or yoke at the flat parallel ends thereof is less than the diameter of said core or yoke at the middle thereof, and the diameter of the hollow cylindrical portion of said insulating coil bobbin is less than the diameter of the middle of said core or yoke.

5. A rotor as claimed in claim 4, wherein the diameter of the hollow cylindrical portion of said insulating coil bobbin is larger than the diameter of the flat parallel ends of said core or yoke.

6. A rotor as claimed in claim 1, 4 or 5, wherein the axial length of said core or yoke is substantially equal to the axial length of said insulating coil bobbin.

* * * * *